United States Patent [19]

Taig

[11] Patent Number: 4,540,383

[45] Date of Patent: Sep. 10, 1985

[54] CENTERING DEVICE FOR A CONSTANT VELOCITY JOINT

[75] Inventor: Alistair G. Taig, South Bend, Ind.

[73] Assignee: Allied Corporation, Morristown, N.J.

[21] Appl. No.: 589,924

[22] Filed: Mar. 15, 1984

[51] Int. Cl.³ .............................................. F16D 3/20
[52] U.S. Cl. .................................................. 464/110
[58] Field of Search ............... 464/113, 114, 117, 118, 464/110, 152, 153

[56] References Cited

U.S. PATENT DOCUMENTS

| | | | |
|---|---|---|---|
| 2,553,020 | 5/1951 | Urschel | 464/118 |
| 2,953,001 | 9/1960 | Hufstader | 464/118 |
| 3,029,618 | 12/1962 | Bouchard et al. | 464/118 |
| 4,274,268 | 6/1981 | Taig | 464/10 |
| 4,317,338 | 3/1982 | Jordan | 464/10 |
| 4,395,246 | 7/1983 | Taig et al. | 464/118 X |

*Primary Examiner*—Stephen Marcus
*Assistant Examiner*—Leo J. Peters
*Attorney, Agent, or Firm*—Larry J. Palguta; Ken C. Decker

[57] ABSTRACT

A constant velocity joint (10) comprises an input shaft assembly (12) and an output shaft assembly (14), each shaft assembly (12, 14) including a cylindrical end (30, 32, and 50, 52) received within a respective pair of arcuate surfaces (40, 42, and 60, 62) in the housing (16). A pilot assembly (70) is disposed between the input shaft assembly (12) and output shaft assembly (14), with a pin (90) extending between pilot members (76, 86) of the pilot assembly (70). The pilot members (76, 86) have complementary-shaped angled faces (78, 88) for surface-to-surface sliding engagement with each other, the pin (90) extending through the centers of angled faces (78, 88) whereby the longitudinal center lines (AO, XX, BO) of the pin (90) and pilot members (76, 86) intersect at the same point (0).

20 Claims, 7 Drawing Figures

U.S. Patent  Sep. 10, 1985  Sheet 1 of 2  4,540,383
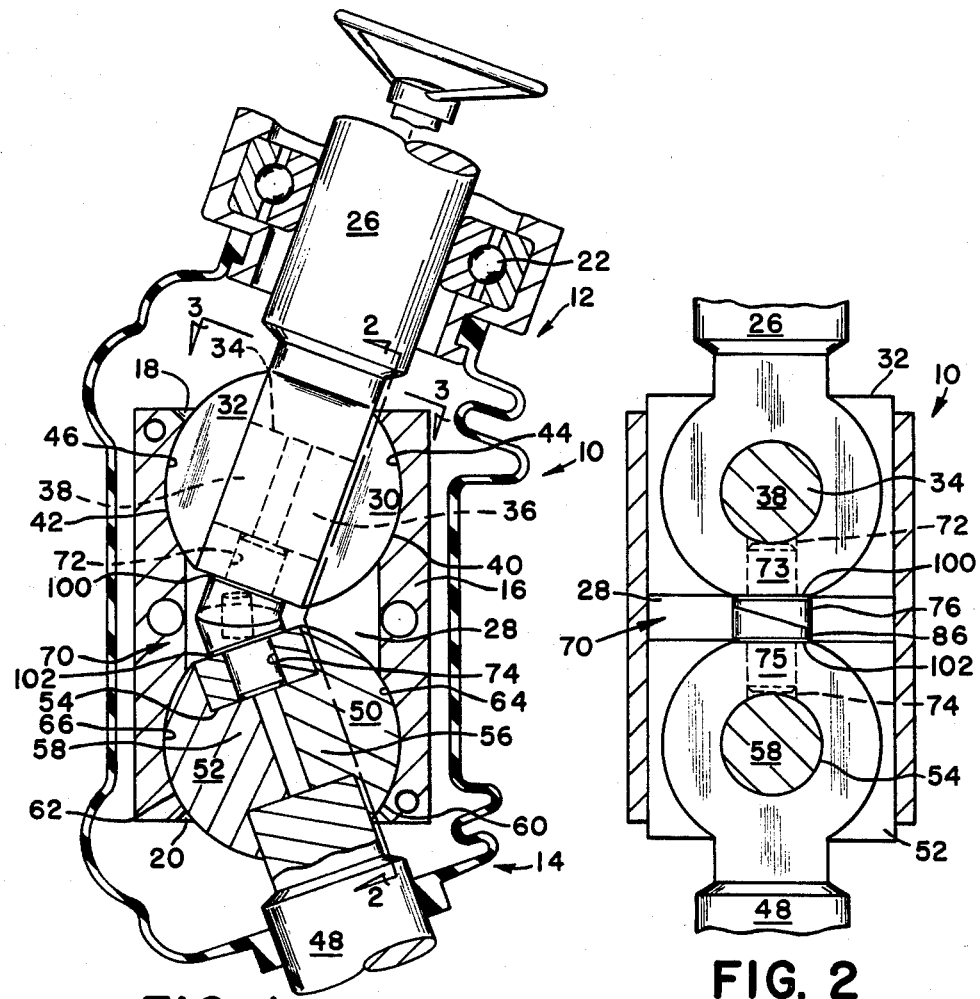
FIG. 1
FIG. 2
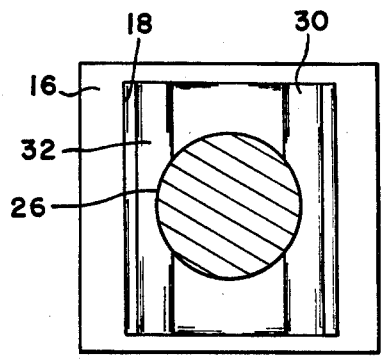
FIG. 3

CENTERING DEVICE FOR A CONSTANT VELOCITY JOINT

The invention relates to a centering device for a constant velocity universal joint of the double Cardan type.

Many constant velocity universal joints comprise two non-constant velocity units coupled so that they operate at equal angles. The units must be coupled to ensure that the joints maintain equal angles and such a joint is described in U.S. Pat. No. 4,395,246, issued July 26, 1982 and entitled "Universal Joint". This patent illustrates several devices for ensuring the symmetry of the joint. However, there is some difficulty in manufacturing these centering devices, and providing a proper load-carrying capability.

It is an object of the present invention to design a constant velocity universal joint which is simple to manufacture and able to carry large loads. The centering device for universal joints disclosed herein constitutes a lower cost alternative to centering devices such as those shown in U.S. Pat. No. 4,395,246 and to the ball and socket centering mechanism commonly used in double-Cardan joints.

The present invention provides a constant velocity joint comprising an input shaft assembly and an output shaft assembly, each shaft assembly including cylindrical ends received within respective ends of a housing. The housing has pairs of arcuate surfaces, each pair of arcuate surfaces receiving therebetween the associated cylindrical ends of the shaft assembly. A pilot assembly is disposed between the input shaft assembly and output shaft assembly, with a pin disposed between pilot members of the pilot assembly. The pilot members have circular cross sections with stepped diameters. Each large diameter portion is terminated by an angled face which is elliptical when viewed normal to its plane, and which engages the complementary-shaped angled face of the other pilot member. The pin extends through the complementary-shaped angled faces at the center point of the elliptical surfaces, whereby the longitudinal center lines of the pin and pilot members intersect at the same point.

The present invention provides a low cost, easily manufactured centering device for a constant velocity double-Cardan universal joint. The centering device remains stationary during rotation of the input and output assemblies, but when the angle of articulation between the input and output shaft assemblies is changed, each pilot member rotates an equal and opposite amount in order to conform to the joint articulation. The pilot assembly maintains equal angles between the housing and the input and output assemblies for a range of angles formed between the input and output assemblies. Consequently, the double-Cardan joint of the present invention provides constant velocity between the input and output assemblies at more than one angle of articulation.

One way of carrying out the invention is described in detail below with reference to the accompanying drawings which illustrate the invention.

FIG. 1 is a partially sectioned side view of a double-Cardan joint in accordance with the invention;

FIG. 2 is a front view taken along view line 2—2 of FIG. 1;

FIG. 3 is a cross section view taken along view line 3—3 of FIG. 1;

Figure 7:
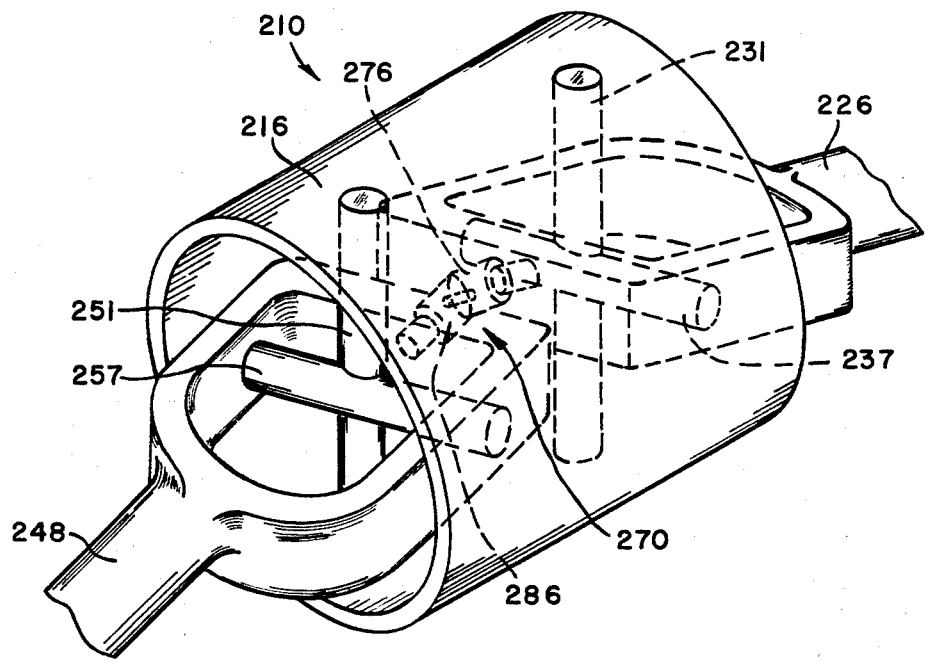
FIG. 7 is a schematic representation of another embodiment.

The universal joint 10 illustrated in FIG. 1 includes an input assembly 12 and an output assembly 14. A housing 16 includes an opening 18 for receiving the input assembly 12 and an opening 20 for receiving the output assembly 14. The input assembly 12 and output assembly 14 include axes which define an angle of articulation therebetween. A bearing 22 journals the input assembly 12. As is well known in the art, if the housing 16 forms the same angular orientation relative to the input assembly as it does relative to the output assembly, the rotation of the output assembly will be the same as that of the input assembly.

Viewing FIGS. 1 and 2 together, the input assembly 12 includes a shaft 26 extending into a cavity 28 within the housing 16, and a pair of bearing shoes 30 and 32. The shaft 26 includes an opening 34 for receiving bosses 36 and 38 of bearing shoes 30 and 32, respectively. The walls of the housing 16 define a cavity 28 which includes a first pair of arcuate surfaces 40 and 42 cooperating to form a circle in cross section. The bearing shoes 30 and 32 also form arcuate surfaces 44 and 46 which define a circle substantially equal in diameter to the circle of surfaces 40 and 42 when the bearing shoes are attached to the end of shaft 26. In similar manner, the output assembly 14 includes a shaft 48 entending into cavity 28 and pair of bearing shoes 50 and 52. The shaft 48 includes an opening 54 for receiving bosses 56 and 58 of bearing shoes 50 and 52, respectively. The wall of the housing 16 defining cavity 28 also forms a second pair of arcuate surfaces 60 and 62 which cooperate to form a circle in cross section. The bearing shoes 50 and 52 also form arcuate surfaces 64 and 66 which are substantially equal in diameter to the circle of surfaces 60 and 62 when the bearing shoes 50 and 52 are attached to the end of shaft 48.

A pilot assembly 70 is carried by the input and output assemblies 12 and 14 within housing cavity 28. Input shaft 26 terminates in an opening 72 and output shaft 48 terminates in an opening 74. The pilot assembly 70 comprises a first pilot member 76 which is cylindrically shaped with a stepped diameter head 79, an angled face 78 (see FIG. 4), and a shaft 73 rotatably received in opening 72. The second pilot member 86 is identically shaped with a stepped diameter head 80, an angled face 88, and a shaft 75 rotatably received in opening 74. The angled faces 78 and 88 are elliptical when viewed normal to their planes. Holes 77 and 87 normal to the respective elliptical faces 78 and 88 are located precisely at the center of the ellipses, the holes 77 and 87 receiving a pin 90 therein, pin 90 being free to rotate within the holes.

Figure 4:
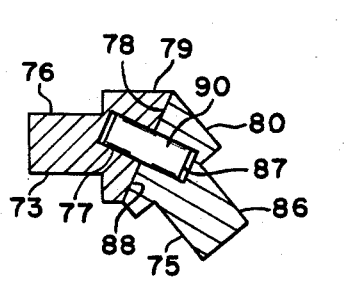
FIG. 4 is a schematic representation of the pilot members of the pilot assembly.
Figure 5:
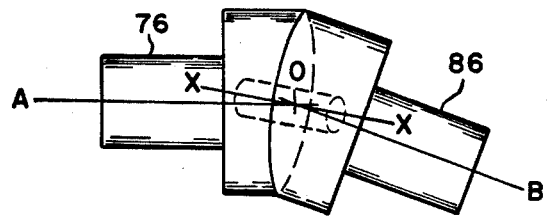
FIG. 5 is a schematic representation of the pilot assembly of FIG. 4 situated at a different relative angle between the two pilot members.

Referring to FIG. 4, it can be seen that when the axes of the pilot members 76, 86 and pin 90 lie in the same plane, a maximum angle is achieved that is equal to twice the angle between each pilot member and the axis of the pin. When one of the pilot members is rotated 180° relative to the other, the three axes will then lie in the same plane and the axes of the two pilot members coincide. FIG. 5 illustrates the pilot members 76, 86 rotated into an intermediate position, where the axis of the pin 90 lies in a different plane from that containing the axes of the pilot members 76, 86. Examining the geometry of FIG. 5, it can be seen that the lengths AO and BO are constant, so that when the pilot members 76, 86 are rotated about their axes such that angled faces 78 and 88 remain in contact, the center distances AO, BO remain constant although the angle AOB may vary. For this condition to be maintained, the pivot axis XX of the pin 90 must pass through the point 0 at which the pilot member axes intersect.

When the pilot assembly 70 is utilized in a double-Cardan constant velocity joint, as shown in FIGS. 1 and 2, the centering device 70 ensures that the input and output shaft assemblies 12, 14 intersect at the center of the joint 10 in order to retain the symmetry of the joint. When joint 10 rotates, centering device 70 remains stationary; but when the articulation of the angle between the input assembly 12 and output assembly 14 is changed, each pilot member 76 and 86 rotates an equal and opposite amount in order to conform with articulation of the joint. Springs such as Belleville or wave washers 100, 102, are located under the respective heads of the pilot assemblies, in contact with the associated shaft to preload the joint 10 so that each pilot member will maintain the angled faces 78, 88 firmly in contact, and also allow some axial movement of the pilot members and their associated shafts to compensate for geometrical changes as articulation of the angle therebetween varies.

When the input assembly 12 is imparting rotation to the housing 16 and the output assembly 14, the pilot assembly 70 remains stationery within cavity 28. Consequently, the input assembly rotatably engages pilot member 76 and output assembly 14 rotatably engages pilot member 86. Also, the input and output assemblies rotate relative to housing 16 in a first plane parallel to the radii of the curvature of the arcuate surfaces 44, 46 and 64, 66. The rotation of the input and output assemblies follows from FIG. 1 wherein the rotation of the universal joint 10 through 180° will move bearing shoes 30 and 50 to the position illustrated for bearing shoes 32 and 52. The bearing shoes 32 and 52 will move to the position illustrated for bearing shoes 30 and 50. Therefore, the outer surfaces 44 and 46 will slidably engage the respective housing surfaces 40 and 42 to rotate counterclockwise relative to the housing. Conversely, the outer surfaces 64 and 66 will slidably engage the respective housing surfaces 60 and 62 to rotate clockwise relative to the housing.

When input assembly 12 is imparting rotation to housing 16 and output assembly 14, the pilot assembly 70 is carrying side forces to prevent housing 16 from moving to a position where the angles formed with the shafts 26 and 48 are different.

Figure 6:
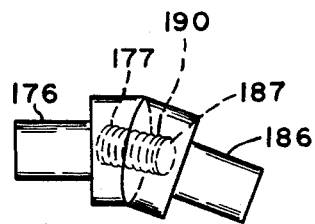
FIG. 6 is a schematic representation of an alternative embodiment.

In an alternative embodiment shown in FIG. 6, the pivot pin 90 which maintains pilot members 76 and 86 in proper alignment, may be replaced by a threaded rod 190 engaging female threads in the holes 177, 187 in the respective pilot members. The threaded engagement of the rod 190 and the threaded openings will prevent separation of the pilot members 176, 186, with the threads not being fully engaged or fully tight in one pilot member and in order to allow limited rotation of pilot members 176 and 186.

FIG. 7 illustrates another alternative embodiment of the invention. There are many types of double-Cardan universal joints, as illustrated and explained in references such as *Universal Joint and Driveshaft Design Manual,* Advances in Engineering Series No. 7, by the Society of Automotive Engineers, 1979. From the above description of the invention, it should be apparent to those skilled in the art that the pilot assembly of the present invention can be utilized in many of the double-Cardan universal joint designs. FIG. 7 is a schematic illustration of such an application in a typical double-Cardan joint design. Double-Cardan universal joint 210 comprises a housing or connecting means 216 rotatably connected to the cross axis pieces 231 and 251. Cross axis piece 237 is rotatably connected to input shaft assembly 226 and cross axis piece 257 is rotatably connected to output shaft assembly 248. Located between the shafts 226 and 248 is the pilot assembly 270 of the present invention having members 276, 286 rotatably received by the respective shafts, angled facial surfaces and a pin, all in accordance with the pilot assembly previously described. The joint 210 and pilot assembly 270 function in the same manner as described for the previous embodiments.

Furthermore, it is contemplated that one skilled in the art could make many modifications and/or changes to the invention as described herein without deviation from the essence thereof. As such these modifications and/or changes are intended to fall within the scope of the appended claims.

I claim:
1. In a universal joint, a housing having a pair of openings for receiving an input shaft assembly and an output shaft assembly, said input shaft assembly being rotatable to inpart rotation to said housing and to said output shaft assembly, said input and output shaft assemblies each terminating in a cylindrical end having a longitudinal axis extending substantially normal to the respective shaft assembly, the housing defining a first pair of arcuate surfaces engageable with the cylindrical end of said input shaft assembly and a second pair of arcuate surfaces engageable with the cylindrical end of said output shaft assembly, said housing rotating with the input and output shaft assemblies to provide for sliding engagement between said cylindrical ends and their respective arcuate surfaces when said input shaft assembly imparts rotation to said housing and output shaft assembly, and a pilot assembly disposed between the cylindrical ends, characterized in that said pilot assembly comprises a first pilot member and a second pilot member each engaging its respective shaft assembly, the first pilot member having an angled face engaging a complementary-shaped angled face of said second pilot member, the angled faces elliptically shaped and in face-to-face engagement across the surfaces of the faces, and pin means extending between said pilot members so that the respective longitudinal center lines of said first and second pilot members and pin means intersect at the same point.

2. The universal joint in accordance with claim 1, wherein said input shaft assembly and output shaft assembly operate at equal angles in order to provide a constant velocity joint.

3. The universal joint in accordance with claim 1, wherein said same point comprises the center point of the universal joint.

4. The universal joint in accordance with claim 1, further comprising means for varying the angle of orientation of one of said shaft assemblies, whereby said angled face and complementary-shaped face slidingly engage as the one shaft assembly is displaced to vary the angle between the assemblies.

5. The universal joint in accordance with claim 4, wherein the longitudinal center lines of said first and second pilot members and pin means intersect at the same point after variation of the angle of orientation of said one shaft assembly.

6. The universal joint in accordance with claim 1, further comprising threads about said pin means and threaded openings in said angled faces, the threaded pin means received in the thread openings and allowing rotation of pilot members relative to each other.

7. In a universal joint having an input shaft assembly and an output shaft assembly with each being connected to a housing, the input shaft assembly being rotatable to rotate the housing and the output shaft assembly, the input and output shaft assemblies cooperating with the housing to define a pair of substantially arcuate interfaces therebetween which permit sliding movement in a first plane between said housing and said assemblies, torque being transmitted from said input shaft assembly to said output shaft assembly via said housing interfaces, and a pilot assembly disposed within the housing in engagement with said input and output shaft assemblies and cooperating with the assemblies to substantially maintain equal angles between the assemblies and housing, the pilot assembly comprising a first pilot member and a second pilot member each received in and rotatably engaging a respective shaft assembly, the members each having an elliptically shaped angled surface complementary with each other and engaging one another in face-to-face engagement across the surfaces, and pin means disposed between said members and extending through each surface.

8. The universal joint in accordance with claim 7, wherein said pilot members remain stationary during rotation of said input and output shaft assemblies.

9. The universal joint in accordance with claim 7, wherein the pin means is disposed at the center point of said pilot members so that the longitudinal center lines of said pin means and first and second pilot members intersect at the same point.

10. The universal joint in accordance with claim 7, wherein said pilot members each comprises a reduced diameter portion received within an opening in the associated shaft assembly and an enlarged diameter portion having an opening for receiving said pin means therein.

11. The universal joint in accordance with claim 10, further comprising threads on said pin means and threads about said openings, the threaded pin means received in the threaded openings and allowing rotation of the pilot members relative to each other.

12. The universal joint in accordance with claim 7, wherein one of said shaft assemblies further comprises means for varying the angular orientation of said shaft assemblies, variation of the angle of orientation effecting rotation of the pilot members whereby the surfaces slidingly engage each other during said rotation.

13. In a universal joint, a housing having a pair of openings for receiving an input shaft assembly and an output shaft assembly, said input shaft assembly being rotatable to inpart rotation to said housing and to said output shaft assembly, said input and output shaft assemblies each terminating in a cylindrical end having a longitudinal axis extending substantially normal to the respective shaft assembly, the housing defining a first pair of arcuate surfaces engageable with the cylindrical end of said input shaft assembly and a second pair of arcuate surfaces engageable with the cylindrical end of said output shaft assembly, said housing rotating with the input and output shaft assemblies to provide for sliding engagement between said cylindrical ends and their respective arcuate surfaces when said input shaft assembly imparts rotation to said housing and output shaft assembly, and a pilot assembly disposed between the cylindrical ends, characterized in that said pilot assembly comprises a first pilot member and a second pilot member each engaging its respective shaft assembly, the first pilot member having an angled face engaging a complementary-shaped angled face of said second pilot member, the angled faces being in planar face-to-face engagement across the surfaces of the faces, and pin means extending between said pilot members so that the respective longitudinal center lines of said first and second pilot members and pin means intersect at the same point.

14. In a universal joint having connecting means for coupling together an input shaft assembly and an output shaft assembly, the input shaft assembly being rotatable to rotate the connecting means and the output shaft assembly, the input and output shaft assemblies cooperating with the connecting means to define a pair of rotatable connections therebetween which permit rotational movement in a first plane between said connecting means and said assemblies, torque being transmitted from said input shaft assembly to said output shaft assembly via said rotatable connections, and a pilot assembly disposed between and in rotatable engagement with the shaft assemblies and cooperating with the assemblies to substantially maintain equal angles between the assemblies and connecting means, the pilot assembly comprising a first pilot member and a second pilot member each received by and rotatably engaging a respective shaft assembly, the members each having an elliptically shaped angled surface complementary with each other and engaging one another in face-to-face engagement across the surfaces, and pin means disposed between said members and extending through each surface.

15. The universal joint in accordance with claim 14, wherein the pin means is disposed at the center point of said pilot members so that the longitudinal center lines of said pin means and first and second pilot members intersect at the same point.

16. The universal joint in accordance with claim 14, wherein said pilot members each comprises a reduced diameter portion received within an opening in the associated shaft assembly and an enlarged diameter portion having an opening for receiving said pin means therein.

17. The universal joint in accordance with claim 14, wherein said pilot members remain stationary during rotation of said input and output shaft assemblies.

18. The universal joint in accordance with claim 14, wherein one of said shaft assemblies further comprises means for varying the angular orientation of said shaft assemblies, variation of the angle of orientation effecting rotation of the pilot members whereby the surfaces slidingly engage each other during said rotation.

19. In a universal joint having an input shaft assembly and an output shaft assembly each being connected to a housing, the input shaft assembly being rotatable to rotate the housing and the output shaft assembly, the input and output shaft assemblies cooperating with the housing to define a pair of substantially arcuate interfaces therebetween which permit sliding movement in a first plane between said housing and said assemblies, torque being transmitted from said input shaft assembly to said output shaft assembly via said housing interfaces, and a pilot assembly disposed within the housing in engagement with said input and output shaft assemblies and cooperating with the assemblies to substantially maintain equal angles between the assemblies and housing, the pilot assembly comprising a first pilot member and a second pilot member each received in and rotatably engaging a respective shaft assembly, the members each having an angled surface complementary with each other and engaging one another in planar face-to-face engagement across the surfaces, and pin means disposed between said members and extending through each surface.

20. In a universal joint having connecting means for coupling together an input shaft assembly and an output shaft assembly, the input shaft assembly being rotatable to rotate the connecting means and the output shaft assembly, the input and output shaft assemblies cooperating with the connecting means to define a pair of rotatable connections therebetween which permit rotational movement in a first plane between said connecting means and said assemblies, torque being transmitted from said input shaft assembly to said output shaft assembly via said rotatable connections, and a pilot assembly disposed between and in rotatable engagement with the shaft assemblies and cooperating with the assemblies to substantially maintain equal angles between the assemblies and connecting means, the pilot assembly comprising a first pilot member and a second pilot member each received by and rotatably engaging a respective shaft assembly, the members each having an angled surface complementary with each other and engaging one another in planar face-to-face engagement across the surfaces, and pin means disposed between said members and extending through each surface.

* * * * *